United States Patent
Cai (10) Patent No.: US 12,174,045 B2
(45) Date of Patent: Dec. 24, 2024

(54) POSITION DETECTION UNIT, LENS MODULE, AND IMAGING APPARATUS

(71) Applicant: TDK CORPORATION, Tokyo (JP)

(72) Inventor: Yongfu Cai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 788 days.

(21) Appl. No.: 17/148,036

(22) Filed: Jan. 13, 2021

(65) Prior Publication Data

US 2021/0255001 A1 Aug. 19, 2021

(30) Foreign Application Priority Data

Feb. 14, 2020 (JP) ................................. 2020-023517

(51) Int. Cl.
*G01D 5/16* (2006.01)
*G01D 5/14* (2006.01)
(Continued)

(52) U.S. Cl.
CPC ............... *G01D 5/16* (2013.01); *G01D 5/145* (2013.01); *G02B 7/04* (2013.01); *H02K 11/215* (2016.01); *H02K 33/18* (2013.01)

(58) Field of Classification Search
CPC .................. G02B 13/16; G02B 25/001; G02B 15/143105; G02B 3/04; G02B 7/04;
(Continued)

(56) References Cited

U.S. PATENT DOCUMENTS 8,575,921 B1 * 11/2013 Sloan ................... G01B 7/003
324/228
9,739,812 B2 8/2017 Tsujimoto
(Continued)

FOREIGN PATENT DOCUMENTS

JP H05-14813 B2 2/1993
JP 2004-226345 A 8/2004
(Continued)

OTHER PUBLICATIONS

Jan. 11, 2022 Notice of Reasons for Refusal issued in Japanese Patent Application No. 2020-023517.

*Primary Examiner* — Huy Q Phan
*Assistant Examiner* — David B Frederiksen
(74) *Attorney, Agent, or Firm* — Oliff PLC (57) ABSTRACT

A position detection unit includes a magnetic sensor, a first magnetic field generator, and a second magnetic field generator. The first magnetic field generator includes a first magnet and generates a first magnetic field. The first magnet includes a first magnetic material and has a first shape. The second magnetic field generator includes a second magnet, generates a second magnetic field, and is movable along a first direction with respect to the first magnetic field generator and the magnetic sensor. The second magnet includes a second magnetic material and has a second shape. The magnetic sensor generates a detection signal corresponding to the direction of a magnetic field of interest, and detects a positional change of the second magnetic field generator. The magnetic field of interest is a composite of the first magnetic field along a first plane and the second magnetic field along the first plane.

6 Claims, 8 Drawing Sheets

(51) Int. Cl.
*G02B 7/04* (2021.01)
*H02K 11/215* (2016.01)
*H02K 33/18* (2006.01)

(58) Field of Classification Search
CPC ........ G02B 7/08; G02B 27/646; G03B 13/06; G03B 13/18; G01D 5/00; G01D 5/12; G01D 5/14; G01D 5/142; G01D 5/145; G01D 5/16
USPC .......................................... 359/645, 643, 13
See application file for complete search history.

(56) References Cited

U.S. PATENT DOCUMENTS

| | | | |
|---|---|---|---|
| 10,627,255 B2 | 4/2020 | Uchida et al. | |
| 10,712,177 B2 | 7/2020 | Umehara et al. | |
| 2003/0197504 A1* | 10/2003 | Gray | G01D 5/04 324/207.21 |
| 2007/0012118 A1* | 1/2007 | Frank | G01D 5/145 73/779 |
| 2007/0279048 A1* | 12/2007 | Schmid | G01D 5/2515 324/207.24 |
| 2014/0184209 A1* | 7/2014 | Kouno | G01D 5/145 324/207.25 |
| 2015/0015729 A1* | 1/2015 | Kasamatsu | H04N 23/54 348/208.11 |
| 2015/0253583 A1* | 9/2015 | Cho | H04N 23/685 359/557 |
| 2016/0334830 A1* | 11/2016 | Sirohiwala | G01D 5/145 |
| 2018/0039161 A1* | 2/2018 | Moto | G02B 7/08 |
| 2018/0216963 A1* | 8/2018 | Uberti | G01D 5/145 |
| 2018/0269734 A1* | 9/2018 | Soma | H02K 21/14 |
| 2018/0274945 A1* | 9/2018 | Uchida | G01D 5/145 |
| 2019/0063951 A1* | 2/2019 | Lee | G01D 5/145 |
| 2019/0162562 A1* | 5/2019 | Min | G02B 27/64 |
| 2021/0372819 A1* | 12/2021 | Cai | G02B 7/02 |

FOREIGN PATENT DOCUMENTS

| | | |
|---|---|---|
| JP | 2018-163023 A | 10/2018 |
| JP | 2018-185315 A | 11/2018 |
| JP | 2019-082414 A | 5/2019 |
| WO | 2014/162730 A1 | 10/2014 |
| WO | 2018/051729 A1 | 3/2018 |

* cited by examiner

POSITION DETECTION UNIT, LENS MODULE, AND IMAGING APPARATUS

CROSS REFERENCE TO RELATED APPLICATIONS

This application claims the benefit of Japanese Priority Patent Application No. 2020-023517 filed on Feb. 14, 2020, the entire contents of which are incorporated herein by reference.

BACKGROUND

The technology relates to a position detection unit, a lens module, and an imaging apparatus that each include a magnetic sensor.

Position detection units using magnetic sensors have been proposed. The Applicant has proposed, for example, a camera module including a position detection unit. For example, reference is made to Japanese Unexamined Patent Application Publication No. 2018-163023. In the camera module, the position detection unit detects the position of a lens that moves in performing focusing. WO 2018/051729 A1 proposes a lens driving device including a position detecting magnet and a magnetism detection member. The position detecting magnet detects a movement position of a lens holding member.

SUMMARY

A position detection unit according to one embodiment of the technology includes a magnetic sensor, a first magnetic field generator, and a second magnetic field generator. The first magnetic field generator includes a first magnet and generates a first magnetic field. The first magnet includes a first magnetic material and has a first shape. The second magnetic field generator includes a second magnet, generates a second magnetic field, and is movable along a first direction with respect to the first magnetic field generator and the magnetic sensor. The second magnet includes a second magnetic material and has a second shape. The magnetic sensor is configured to generate a detection signal that corresponds to the direction of a magnetic field of interest, and configured to detect a positional change of the second magnetic field generator. The magnetic field of interest is a composite of the first magnetic field along a first plane and the second magnetic field along the first plane.

A position detection unit according to one embodiment of the technology includes a magnetic sensor, a first magnetic field generator, and a second magnetic field generator. The first magnetic field generator includes a first magnet and generates a first magnetic field. The first magnet includes a first magnetic material and has a first permeance coefficient. The second magnetic field generator includes a second magnet, generates a second magnetic field, and is movable along a first direction with respect to the first magnetic field generator and the magnetic sensor. The second magnet includes the first magnetic material and has a second permeance coefficient equal to the first permeance coefficient. The magnetic sensor is configured to generate a detection signal that corresponds to the direction of a magnetic field of interest, and configured to detect a positional change of the second magnetic field generator. The magnetic field of interest is a composite of the first magnetic field in a predetermined plane and the second magnetic field in the predetermined plane.

A lens module according to one embodiment of the technology includes a magnetic sensor, a first magnetic field generator, a second magnetic field generator, and a lens. The first magnetic field generator includes a first magnet and generates a first magnetic field. The first magnet includes a first magnetic material and has a first shape. The second magnetic field generator includes a second magnet, generates a second magnetic field, and is movable along a first direction with respect to the first magnetic field generator and the magnetic sensor. The second magnet includes a second magnetic material and has a second shape. The lens is movable along the first direction in conjunction with the second magnetic field generator with respect to the first magnetic field generator and the magnetic sensor. The magnetic sensor is configured to generate a detection signal that corresponds to the direction of a magnetic field of interest, and configured to detect a positional change of the second magnetic field generator. The magnetic field of interest is a composite of the first magnetic field along a first plane and the second magnetic field along the first plane.

A lens module according to one embodiment of the technology includes a magnetic sensor, a first magnetic field generator, a second magnetic field generator, and a lens. The first magnetic field generator includes a first magnet and generates a first magnetic field. The first magnet includes a first magnetic material and has a first permeance coefficient. The second magnetic field generator includes a second magnet, generates a second magnetic field, and is movable along a first direction with respect to the first magnetic field generator and the magnetic sensor. The second magnet includes the first magnetic material and has a second permeance coefficient equal to the first permeance coefficient. The lens is movable along the first direction in conjunction with the second magnetic field generator with respect to the first magnetic field generator and the magnetic sensor. The magnetic sensor is configured to generate a detection signal that corresponds to the direction of a magnetic field of interest, and configured to detect a positional change of the second magnetic field generator. The magnetic field of interest is a composite of the first magnetic field in a predetermined plane and the second magnetic field in the predetermined plane.

An imaging apparatus according to one embodiment of the technology includes an imaging element and a lens module. The lens module includes a magnetic sensor, a first magnetic field generator, a second magnetic field generator, and a lens. The first magnetic field generator includes a first magnet and generates a first magnetic field. The first magnet includes a first magnetic material and has a first shape. The second magnetic field generator includes a second magnet, generates a second magnetic field, and is movable along a first direction with respect to the first magnetic field generator and the magnetic sensor. The second magnet includes a second magnetic material and has a second shape. The lens is movable along the first direction in conjunction with the second magnetic field generator with respect to the first magnetic field generator and the magnetic sensor. The magnetic sensor is configured to generate a detection signal that corresponds to the direction of a magnetic field of interest, and configured to detect a positional change of the second magnetic field generator. The magnetic field of interest is a composite of the first magnetic field along a first plane and the second magnetic field along the first plane.

An imaging apparatus according to one embodiment of the technology includes an imaging element and a lens module. The lens module includes a magnetic sensor, a first magnetic field generator, a second magnetic field generator, and a lens. The first magnetic field generator includes a first magnet and generates a first magnetic field. The first magnet includes a first magnetic material and has a first permeance coefficient. The second magnetic field generator includes a second magnet, generates a second magnetic field, and is movable along a first direction with respect to the first magnetic field generator and the magnetic sensor. The second magnet includes the first magnetic material and has a second permeance coefficient equal to the first permeance coefficient. The lens is movable along the first direction in conjunction with the second magnetic field generator with respect to the first magnetic field generator and the magnetic sensor. The magnetic sensor is configured to generate a detection signal that corresponds to the direction of a magnetic field of interest, and configured to detect a positional change of the second magnetic field generator. The magnetic field of interest is a composite of the first magnetic field in a predetermined plane and the second magnetic field in the predetermined plane.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

It is demanded that position detection units using magnetic sensors be improved in position detection accuracy.

It is desirable to provide a position detection unit, a lens module, and an imaging apparatus that achieve high detection accuracy.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

1. Example Embodiment

An example of an imaging apparatus including a lens module. The lens module includes a first magnetic field generator, a second magnetic field generator, and a magnetic sensor. The first magnetic field generator generates a first magnetic field for driving a lens. The second magnetic field generator generates a second magnetic field and moves along with the lens. The magnetic sensor detects the position of the lens.

2. Modification Example

[1. Example Embodiment]
[Configuration of Imaging Apparatus 100]

First, a configuration of an imaging apparatus 100 according to an example embodiment of the technology will be described with reference to FIGS. 1 and 2.

Figure 1:
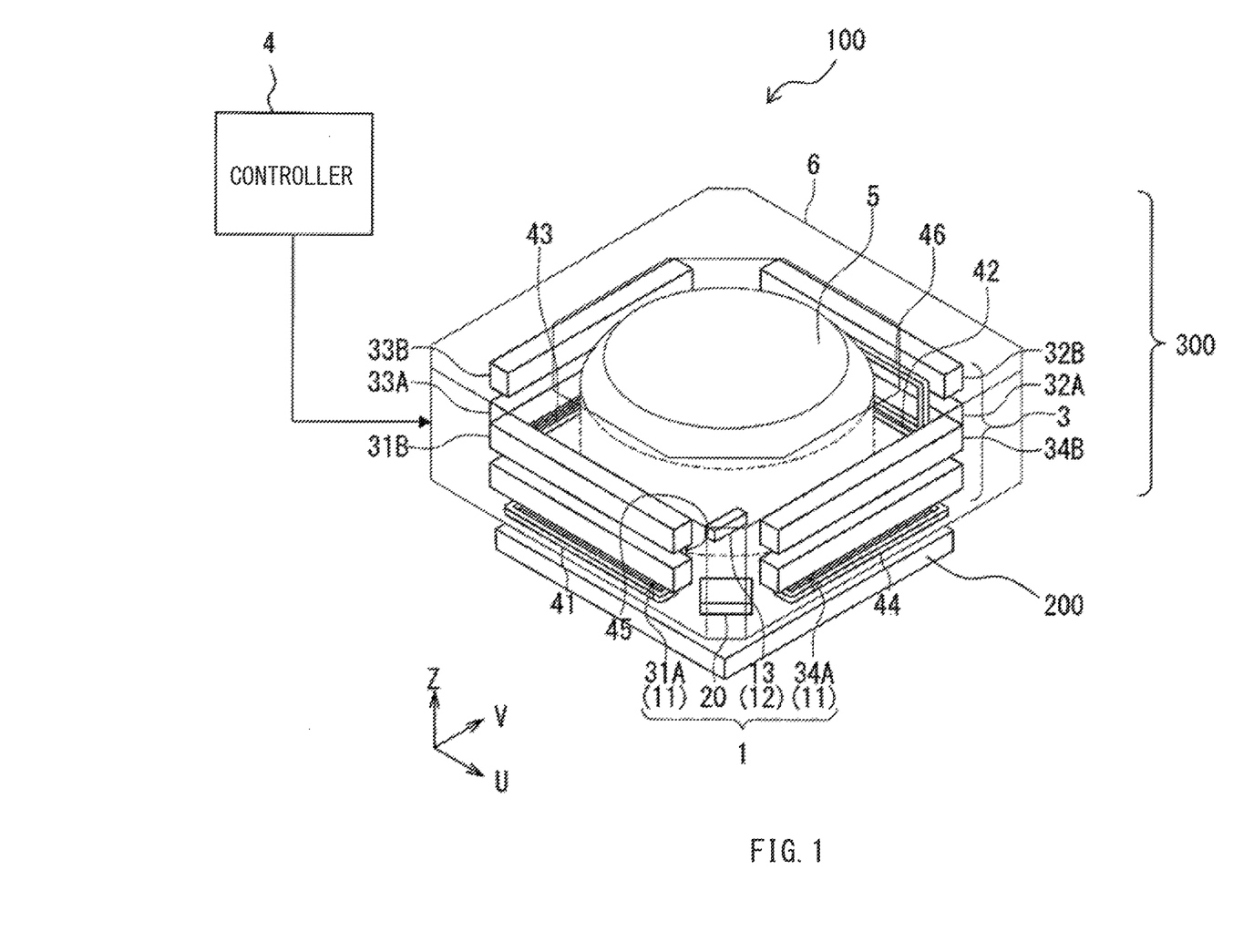
FIG. 1 is a schematic perspective diagram illustrating an overall configuration example of an imaging apparatus including a lens module that includes a position detection unit according to one example embodiment of the technology.

FIG. 1 is a perspective diagram illustrating an overall configuration example of the imaging apparatus 100. FIG. 2 is an explanatory diagram schematically illustrating the inside of the imaging apparatus 100. It is to be noted that for ease of understanding, in FIG. 2 the components of the imaging apparatus 100 are drawn on a different scale and in a different layout than those of the corresponding components in FIG. 1.

The imaging apparatus 100 may constitute, for example, a portion of a camera for a smartphone having an optical image stabilization mechanism and an autofocus mechanism. The imaging apparatus 100 includes an image sensor 200 as an imaging element, and a lens module 300, for example. The image sensor 200 may acquire an image by using a complementary metal-oxide semiconductor (CMOS) or the like. The lens module 300 may guide light from a subject to the image sensor 200.

[Configuration of Lens Module 300]

The lens module 300 may include a position detection unit 1 according to an example embodiment of the technology, and a drive unit 3, a lens 5, a housing 6, and a substrate 7. The position detection unit 1 may be a magnetic position detection unit and may detect the position of the lens 5 in performing automatic focusing on light entering from the subject (hereinafter, simply "entering light") to allow the entering light to form an image on an imaging plane of the image sensor 200. The drive unit 3 may move the lens 5 to perform the focusing on the entering light. The housing 6 may accommodate and protect the components including the position detection unit 1 and the drive unit 3. The substrate 7 may have a top surface 7a. Note that FIG. 1 omits the illustration of the substrate 7 and FIG. 2 omits the illustration of the housing 6.

Figure 2:
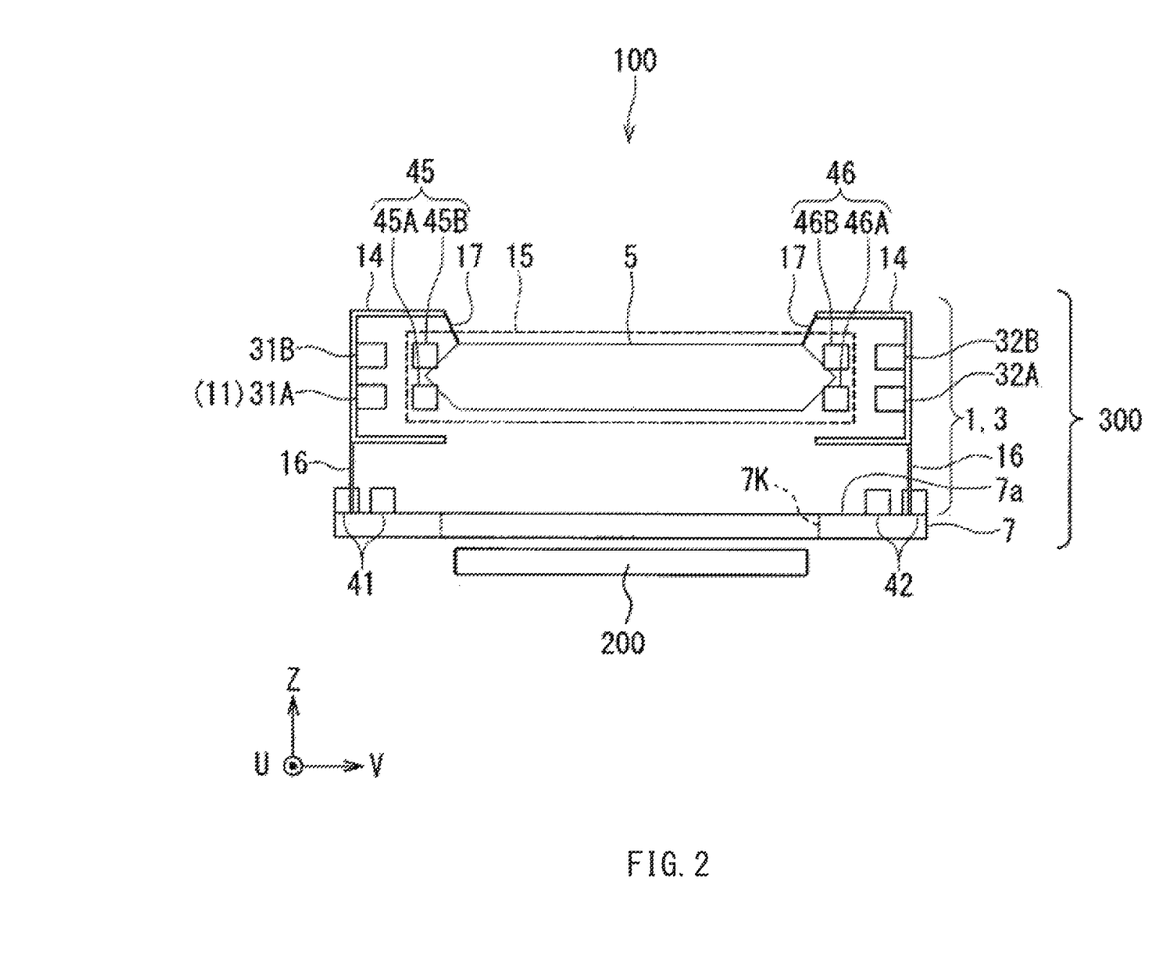
FIG. 2 is an explanatory diagram schematically illustrating the inside of the imaging apparatus illustrated in FIG. 1.

Here, a U-axis, a V-axis, and a Z-axis are defined as illustrated in FIGS. 1 and 2. The U-axis, the V-axis, and the Z-axis are orthogonal to each other. In the present example embodiment, the Z-axis is perpendicular to the top surface 7a of the substrate 7, and both the U-axis and the V-axis are parallel to the top surface 7a of the substrate 7. Further, in the present example embodiment, a +Z direction is upward, and a −Z direction is downward.

(Lens 5)

The lens 5 may be disposed above the top surface 7a of the substrate 7, with its optical axis coinciding with the Z-axis. The substrate 7 may have an opening 7K (not illustrated) that allows light having passed through the lens 5 to pass therethrough. As illustrated in FIG. 2, the lens module 300 may be in alignment with the image sensor 200 to allow the light from the subject to enter the image sensor 200 after passing through the lens 5 and the opening 7K of the substrate 7 in this order.

(Position Detection Unit 1 and Drive Unit 3)

Figure 3:
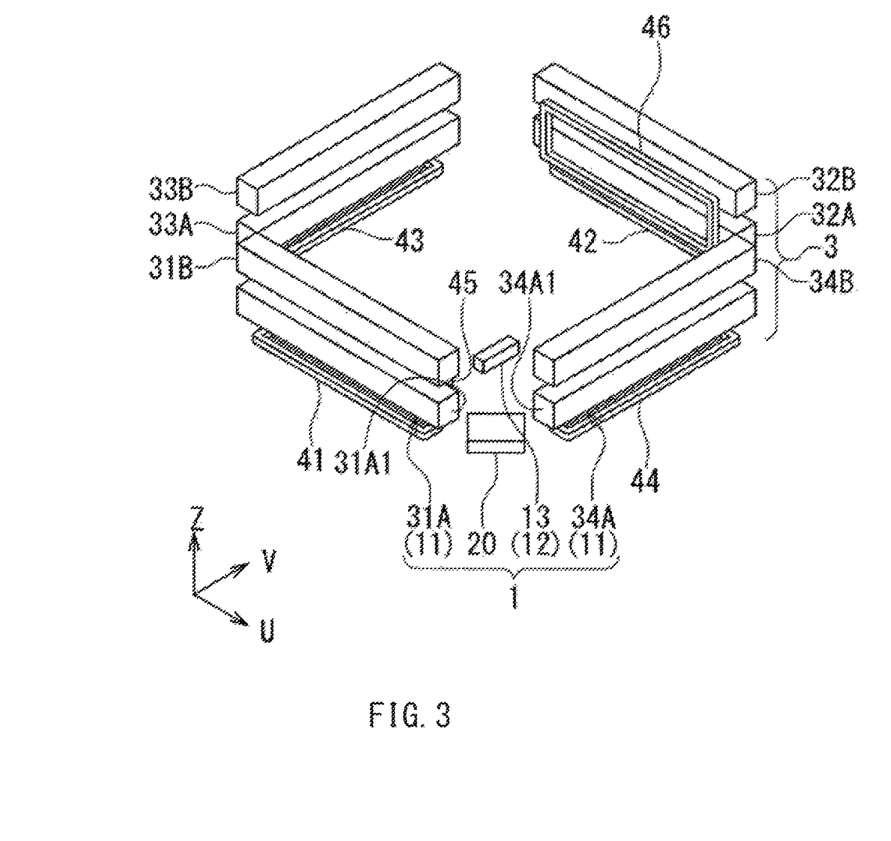
FIG. 3 is an explanatory diagram schematically illustrating a portion of the position detection unit illustrated in FIG. 1.
Figure 4:
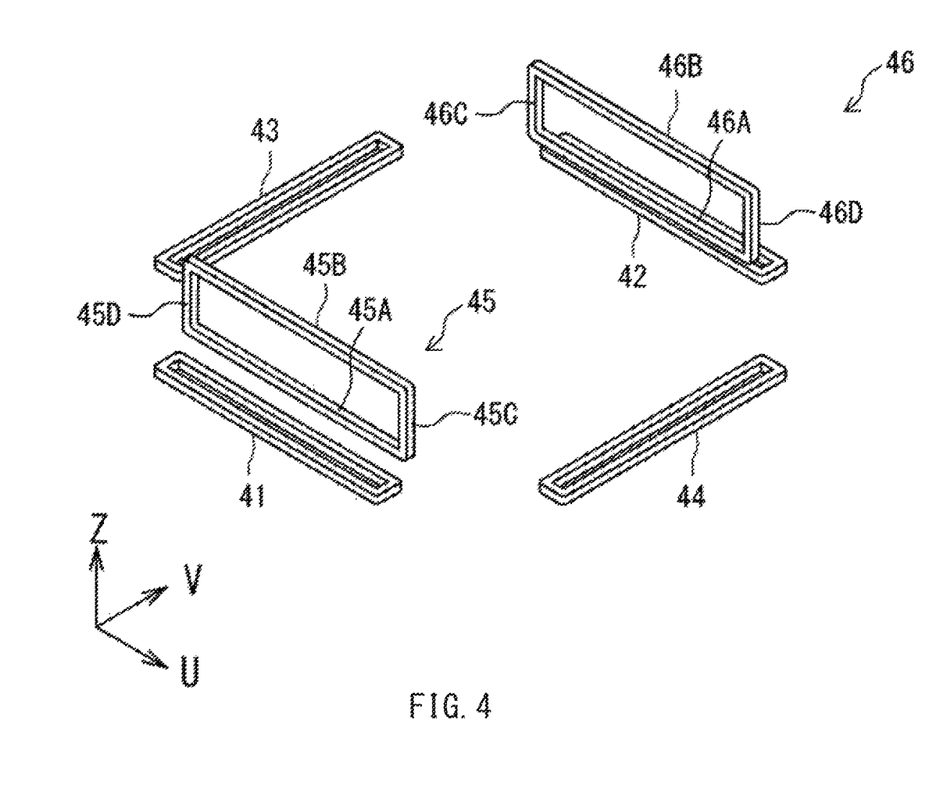
FIG. 4 is an explanatory diagram schematically illustrating a portion of a drive unit illustrated in FIG. 1.
Figure 5:
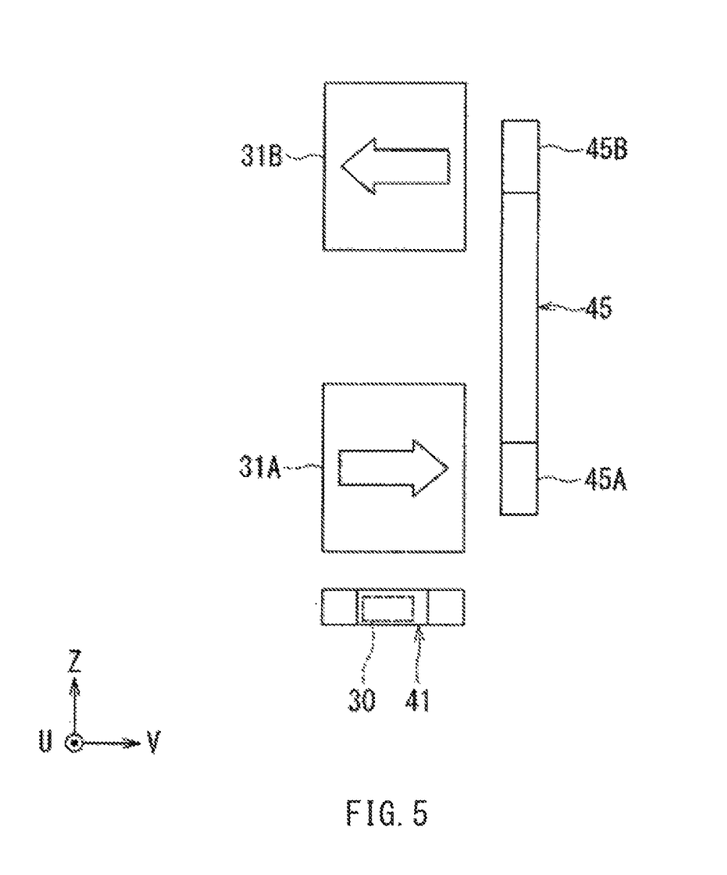
FIG. 5 is a side view of a portion of the drive unit illustrated in FIG. 1.

Next, the position detection unit 1 according to the present example embodiment and the drive unit 3 will be described in detail with reference to FIGS. 2 to 5. FIG. 3 is a perspective view of the position detection unit 1 and the drive unit 3 of the lens module 300. FIG. 4 is a perspective view of coils 41 to 46 of the drive unit 3. FIG. 5 is a side view of a portion of the drive unit 3.

The position detection unit 1 may include a first holding member 14, a second holding member 15, two or more first wires 16, and two or more second wires 17. The second holding member 15 may hold the lens 5. The second holding member 15 may have, for example, a hollow cylinder shape to allow the lens 5 to be installed therein. Note that the first wires 16 and the second wires 17 may be omitted from the position detection unit 1.

The second holding member 15 may be movable along a direction of the optical axis of the lens 5, that is, along a Z-axis direction with respect to the first holding member 14. In the present example embodiment, the first holding member 14 may have a box shape allowing the lens 5 and the second holding member 15 to be placed therein. The two or more second wires 17 may couple the first holding member 14 and the second holding member 15 to each other, and may support the second holding member 15 to allow the second holding member 15 to be movable along the Z-axis direction with respect to the first holding member 14.

The first holding member 14 may be provided above the top surface 7a of the substrate 7 and movable in both of a U-axis direction and a V-axis direction with respect to the substrate 7. The two or more first wires 16 may, while coupling the substrate 7 and the first holding member 14 to each other, support the first holding member 14 to allow the first holding member 14 to be movable in both of the U-axis direction and the V-axis direction with respect to the substrate 7. Upon a change in a relative position of the first holding member 14 with respect to the substrate 7, a relative position of the second holding member 15 with respect to the substrate 7 may also change.

The position detection unit 1 further includes a first magnetic field generator 11 generating a first magnetic field MF1, a second magnetic field generator 12 generating a second magnetic field MF2, and a magnetic sensor 20. The first magnetic field generator 11 may include two first magnets disposed at different positions from each other. For example, the first magnetic field generator 11 may include a magnet 31A and a magnet 34A as the above-described two first magnets. The first magnetic field MF1 may be a composite magnetic field of a magnetic field generated by the magnet 31A and a magnetic field generated by the magnet 34A. The magnets 31A and 34A each include a first magnetic material, and may each have a rectangular parallelepiped shape, for example. Examples of the first magnetic material include a neodymium-based magnet material such as NdFeB. In some embodiments, the first magnetic material may be NdFeB of grade N48H, for example. The magnets 31A and 34A may each have a first temperature coefficient of residual magnetic flux density. The magnets 31A and 34A may be fixed to the first holding member 14. In other words, the first magnetic field generator 11 may be held by the first holding member 14. The magnets 31A and 34A may each serve as a drive magnet that generates a drive force to cause the second holding member 15 holding the lens 5 to move along the Z-axis. In addition, the magnets 31A and 34A may also serve as bias magnets to apply a bias to the magnetic sensor 20.

As illustrated in FIG. 3, the magnet 31A may have an end face 31A1 located at an end of the magnet 31A in a +U direction. The magnet 34A may have an end face 34A1 located at an end of the magnet 34A in a −V direction.

The second magnetic field generator 12 may be provided with its relative position with respect to the first magnetic field generator 11 being changeable. The second magnetic field generator 12 may include a magnet 13, for example. The second magnetic field MF2 may thus be a magnetic field generated by the magnet 13. The magnet 13 includes a second magnetic material, which may be different from the first magnetic material. The magnet 13 may have a rectangular parallelepiped shape, for example, as with the magnets 31A and 34A. However, the shape of the magnet 13 may be different from the shape of the magnets 31A and 34A. In other words, the shape of the magnet 13 may be neither identical nor similar to the shape of the magnets 31A and 34A. Examples of the second magnetic material include a neodymium-based magnet material such as NdFeB. For example, the second magnetic material may be NdFeB of grade N48SH. Optionally, SmCo may be used as the second magnetic material. The magnet 13 may have a second temperature coefficient of residual magnetic flux density. In some embodiments, the second temperature coefficient of residual magnetic flux density that the magnet 13 has may be smaller in absolute value than the first temperature coefficient of residual magnetic flux density that the magnets 31A and 34A have. The magnet 13 may serve as a magnet for position detection that generates the second magnetic field MF2 for use to detect the position of the second holding member 15 holding the lens 5.

The magnet 13 may be fixed to the second holding member 15 and located in a space near the end face 31A1 (FIG. 3) of the magnet 31A and the end face 34A1 (FIG. 3) of the magnet 34A. In other words, the second magnetic field generator 12 may be held by the second holding member 15. Upon a change in a relative position of the second holding member 15 with respect to the first holding member 14 along the Z-axis direction, the relative position of the second magnetic field generator 12 with respect to the first magnetic field generator 11 may also change along the Z-axis direction.

The magnetic sensor 20 may detect a magnetic field of interest at a predetermined detection position where the magnetic sensor 20 is disposed. The magnetic sensor 20 generates a detection signal corresponding to the direction of the magnetic field of interest. The magnetic sensor 20 may be fixed to the substrate 7 and located near both of the end face 31A1 of the magnet 31A and the end face 34A1 of the magnet 34A. In some embodiments, the magnetic sensor 20 may be at substantially equal distances from the magnet 31A and the magnet 34A. The magnet 13 may be disposed above the magnetic sensor 20, for example.

Figure 6:
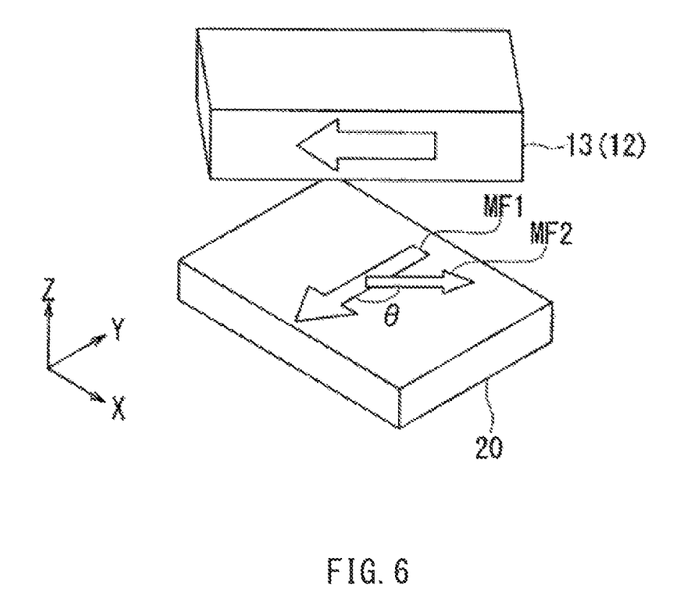
FIG. 6 is a schematic perspective view of a portion of the position detection unit illustrated in FIG. 1.
Figure 9:
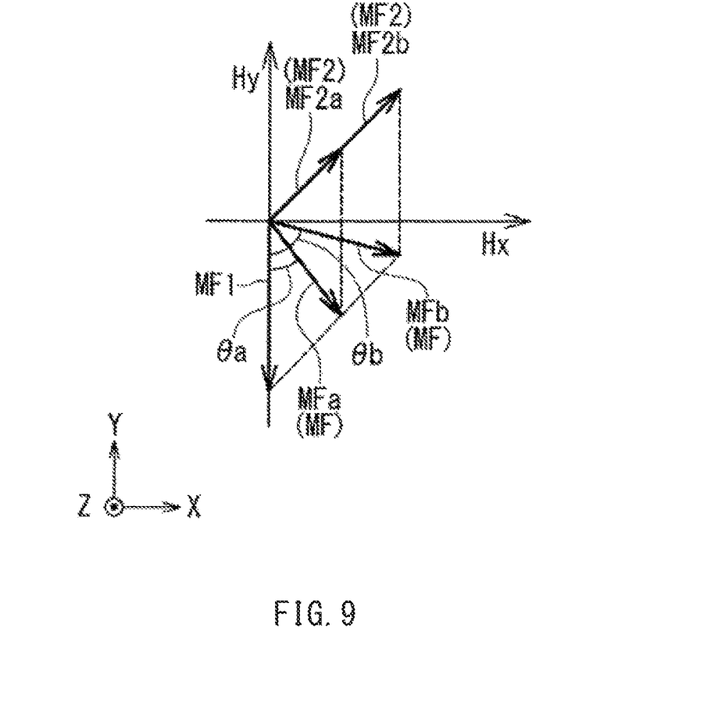
FIG. 9 is an explanatory diagram illustrating a first magnetic field, a second magnetic field, and a composite magnetic field from the position detection unit illustrated in FIG. 1.

In the present example embodiment, the predetermined detection position may be the position where the magnetic sensor 20 is disposed. Upon a change in the position of the second magnetic field generator 12 with respect to the position of the first magnetic field generator 11 as described above, a distance between the predetermined detection position and the second magnetic field generator 12 may change. The magnetic field of interest may be a composite magnetic field MF of the first magnetic field MF1 and the second magnetic field MF2 at the detection position. The magnetic sensor 20 is configured to detect a positional change of the second magnetic field generator 12 by detecting the composite magnetic field MF. The first magnetic field MF1 and the second magnetic field MF2 are illustrated in FIG. 6 to be described later. The composite magnetic field MF is illustrated in FIG. 9 to be described later. Positional relationships between the first magnetic field generator 11, the second magnetic field generator 12, and the magnetic sensor 20, and a configuration of the magnetic sensor 20 will be described in detail later.

The drive unit 3 may include the magnets 31A and 34A, magnets 31B, 32A, 32B, 33A, 33B, and 34B, and the coils 41, 42, 43, 44, 45, and 46. As illustrated in FIGS. 1 and 2, the magnet 31A may be located in the −V direction as viewed from the lens 5. The magnet 32A may be located in a +V direction as viewed from the lens 5. The magnet 33A may be located in a −U direction as viewed from the lens 5. The magnet 34A may be located in the +U direction as viewed from the lens 5. The magnets 31B, 32B, 33B, and 34B may be located above, i.e., in the +Z direction from the magnets 31A, 32A, 33A, and 34A, respectively. Further, the magnets 31A, 31B, 32A, 32B, 33A, 33B, 34A, and 34B may be held by the first holding member 14.

As illustrated in FIG. 3, the magnets 31A, 31B, 32A, and 32B may each have a rectangular parallelepiped shape with the direction of the length thereof along the U-axis direction. The magnets 33A, 33B, 34A, and 34B may each have a rectangular parallelepiped shape with the direction of the length thereof along the V-axis direction. The magnets 31A and 32B may each have a magnetization in the +V direction. The magnets 31B and 32A may each have a magnetization in the −V direction. The magnets 33A and 34B may each have a magnetization in the +U direction. The magnets 33B and 34A may each have a magnetization in the −U direction. In FIG. 5, arrows drawn in the magnets 31A and 31B indicate the magnetization directions of the magnets 31A and 31B, respectively.

As illustrated in FIGS. 1 and 2, the coil 41 may be disposed between the magnet 31A and the substrate 7. The coil 42 may be disposed between the magnet 32A and the substrate 7. The coil 43 may be disposed between the magnet 33A and the substrate 7. The coil 44 may be disposed between the magnet 34A and the substrate 7. The coil 45 may be disposed between the lens 5 and the magnets 31A and 31B. The coil 46 may be disposed between the lens 5 and the magnets 32A and 32B. Further, the coils 41, 42, 43, and 44 may each be fixed to the substrate 7. The coils 45 and 46 may each be fixed to the second holding member 15.

The coil 41 may be subjected to a magnetic field occurring from the magnet 31A. The coil 42 may be subjected to a magnetic field occurring from the magnet 32A. The coil 43 may be subjected to a magnetic field occurring from the magnet 33A. The coil 44 may be subjected to a magnetic field occurring from the magnet 34A.

As illustrated in FIGS. 2, 4, and 5, the coil 45 may include a first conductor 45A extending along the U-axis along which the magnet 31A may extend, a second conductor 45B extending along the U-axis along which the magnet 31B may extend, and two third conductors 45C and 45D coupling the first conductor 45A and the second conductor 45B to each other. Further, as illustrated in FIG. 4, the coil 46 may include a first conductor 46A extending along the U-axis along which the magnet 32A may extend, a second conductor 46B extending along the U-axis along which the magnet 32B may extend, and two third conductors 46C and 46D coupling the first conductor 46A and the second conductor 46B to each other.

The first conductor 45A of the coil 45 may be subjected to a +V direction component of the magnetic field occurring from the magnet 31A. The second conductor 45B of the coil 45 may be subjected to a −V direction component of a magnetic field occurring from the magnet 31B. The first conductor 46A of the coil 46 may be subjected to a −V direction component of the magnetic field occurring from the magnet 32A. The second conductor 46B of the coil 46 may be subjected to a +V direction component of a magnetic field occurring from the magnet 32B.

The drive unit 3 may further include four magnetic sensors 30 located on respective inner sides of the coils 41 to 44 and fixed to the substrate 7. As will be described later, the four magnetic sensors 30 may be used in changing the position of the lens 5 in order to reduce an influence of a hand-induced apparatus shake.

The magnetic sensor 30 located inside the coil 41 may detect the magnetic field occurring from the magnet 31A and may generate a signal corresponding to the position of the magnet 31A. The magnetic sensor 30 located inside the coil 42 may detect the magnetic field occurring from the magnet 32A and may generate a signal corresponding to the position of the magnet 32A. The magnetic sensor 30 located inside the coil 43 may detect the magnetic field occurring from the magnet 33A and may generate a signal corresponding to the position of the magnet 33A. The magnetic sensor 30 located inside the coil 44 may detect the magnetic field occurring from the magnet 34A and may generate a signal corresponding to the position of the magnet 34A. The magnetic sensors 30 may each include an element that detects a magnetic field, such as a Hall element. It is to be noted that the drive unit 3 may include only one of the magnetic sensor 30 located inside the coil 41 and the magnetic sensor 30 located inside the 42. Likewise, the drive unit 3 may include only one of the magnetic sensor 30 located inside the coil 43 and the magnetic sensor 30 located inside the coil 44.

Next, the positional relationships between the first magnetic field generator 11, the second magnetic field generator 12, and the magnetic sensor 20 will be described in detail with reference to FIGS. 3 and 6. FIG. 6 is a perspective view of a portion of the position detection unit 1. Here, a +X direction and a +Y direction are defined as illustrated in FIG. 6. Both the +X direction and the +Y direction are parallel to the top surface 7a (see FIG. 2) of the substrate 7. The +X direction is a direction 450 rotated from the +U direction toward the +V direction. The +Y direction is a direction 450 rotated from the +V direction toward the −U direction. Further, a direction opposite to the +X direction is denoted as a −X direction, and a direction opposite to the +Y direction is denoted as a −Y direction.

In FIG. 6, an arrow with a reference sign MF1 represents the first magnetic field MF1 at the detection position. In the present example embodiment, the first magnetic field generator 11 and the magnetic sensor 20 may be arranged to cause the first magnetic field MF1 at the detection position to be in the −Y direction. The direction of the first magnetic field MF1 at the detection position may be adjustable by, for example, relative positions of the magnets 31A and 34A with respect to the magnetic sensor 20 and orientations of the magnets 31A and 34A with respect to the magnetic sensor 20. In some embodiments, the magnets 31A and 34A may be arranged symmetrically about a YZ plane including the detection position.

In FIG. 6, an arrow with a reference sign MF2 represents the second magnetic field MF2 at the detection position, and an arrow drawn in the magnet 13 represents the magnetization of the magnet 13. Further, a symbol θ represents a relative angle formed by a direction of the second magnetic field MF2 at the detection position with respect to the direction of the first magnetic field MF1 at the detection position. The relative angle θ is represented by a value within a range from 0° to 180° both inclusive.

In the present example embodiment, the first magnetic field generator 11, the second magnetic field generator 12, and the magnetic sensor 20 may be arranged to cause the relative angle θ to be greater than 900 and smaller than 180°. The relative angle θ may be adjustable by the orientation of the magnet 13, for example. FIG. 6 illustrates an example in which the relative angle θ is set to 135°. In this example, the magnet 13 is oriented to cause the magnetization of the magnet 13 to be in a direction 450 rotated from the −X direction toward the −Y direction.

Figure 7:
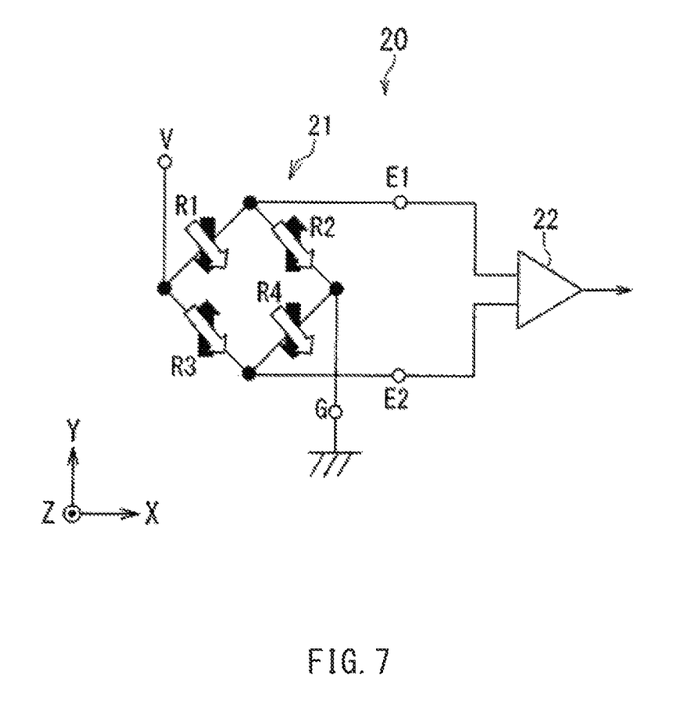
FIG. 7 is a circuit diagram illustrating a circuit configuration of a magnetic sensor in the position detection unit illustrated in FIG. 1.

Next, a configuration of the magnetic sensor 20 will be described with reference to FIG. 7. FIG. 7 is a circuit diagram illustrating an example configuration of the magnetic sensor 20. In the present example embodiment, the magnetic sensor 20 may be configured to generate, as the detection signal corresponding to the direction of the magnetic field of interest, a detection signal corresponding to an angle that a direction of the composite magnetic field MF forms with respect to a reference direction. The reference direction may be the direction of the first magnetic field MF1, that is, the −Y direction.

As illustrated in FIG. 7, the magnetic sensor 20 may include a Wheatstone bridge circuit 21 and a difference detector 22. The Wheatstone bridge circuit 21 may include a power supply port V, a ground port G, two output ports E1 and E2, a first pair of magnetic detection devices R1 and R2 coupled in series to each other, and a second pair of magnetic detection devices R3 and R4 coupled in series to each other. One end of each of the magnetic detection devices R1 and R3 may be coupled to the power supply port V. Another end of the magnetic detection device R1 may be coupled to one end of the magnetic detection device R2 and the output port E1. Another end of the magnetic detection device R3 may be coupled to one end of the magnetic detection device R4 and the output port E2. Another end of each of the magnetic detection devices R2 and R4 may be coupled to the ground port G. The ground port V may receive a power supply voltage of a predetermined magnitude. The ground port G may be coupled to a ground.

In the present example embodiment, the magnetic detection devices R1 to R4 may each include two or more magnetoresistive effect elements (MR elements) coupled in series to each other. The two or more MR elements may each be a spin-valve MR element. The spin-valve MR element may include a magnetization pinned layer, a free layer, and a nonmagnetic layer disposed between the magnetization pinned layer and the free layer. The magnetization pinned layer has a magnetization pinned in a certain direction. The free layer is a magnetic layer having a magnetization that changes its direction in accordance with the direction of the magnetic field of interest. The spin-valve MR element may be a TMR element or a GMR element. In the TMR element, the nonmagnetic layer is a tunnel barrier layer. In the GMR element, the nonmagnetic layer is a nonmagnetic electrically-conductive layer. The spin-valve MR element changes in resistance in accordance with an angle that the magnetization direction of the free layer forms with respect to the magnetization direction of the magnetization pinned layer. The resistance of the spin-valve MR element is at a minimum value in a case where the foregoing angle is 0°, and at a maximum value in a case where the foregoing angle is 180°. In FIG. 7, the filled arrows each indicate the magnetization direction of the magnetization pinned layer of the MR element, and the hollow arrows each indicate the magnetization direction of the free layer of the MR element.

The magnetization pinned layers of the MR elements included in the magnetic detection devices R1 and R4 may have magnetizations in the −Y direction, and the magnetization pinned layers of the MR elements included in the magnetic detection devices R2 and R3 may have magnetizations in the +Y direction. In such a case, a potential difference between the output ports E1 and E2 changes in accordance with the cosine of the angle that the direction of the composite magnetic field MF forms with respect to the −Y direction. The difference detector 22 may output a signal corresponding to the potential difference between the output ports E1 and E2 as a detection signal. The magnetic sensor 20 may thus detect the composite magnetic field MF and thereby generate the detection signal corresponding to the cosine of the angle that the direction of the composite magnetic field MF forms with respect to the −Y direction.

Considering, for example, the degree of accuracy with which the MR elements are fabricated, the magnetization directions of the magnetization pinned layers in the MR elements may slightly differ from the above-described directions.

Figure 8:
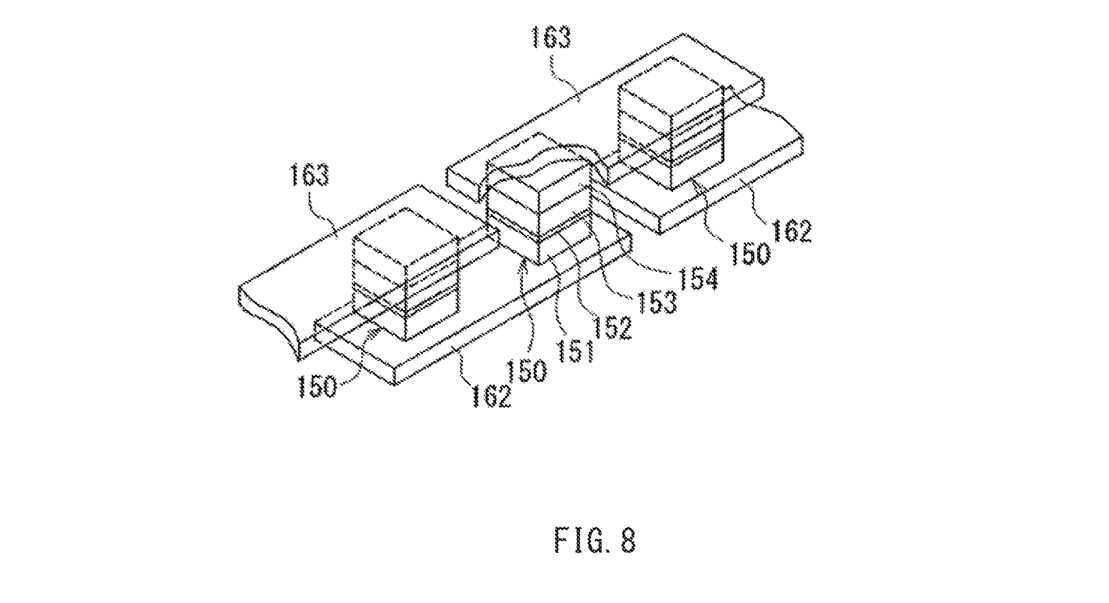
FIG. 8 is a perspective view of a portion of a magnetic detection device in FIG. 7.

An example configuration of the magnetic detection device will now be described with reference to FIG. 8. FIG. 8 is a perspective view of a portion of one magnetic detection device of the magnetic sensor 20 illustrated in FIG. 7. In this example, the magnetic detection device may include two or more lower electrodes 162, two or more magnetoresistive effect (MR) elements 150, and two or more upper electrodes 163. The lower electrodes 162 may be disposed on a substrate (not illustrated). The lower electrodes 162 may each have a long slender shape. Every two lower electrodes 162 adjacent to each other in the direction of the length thereof may have a gap therebetween. As illustrated in FIG. 8, two MR element 150 may be disposed on the top surface of each lower electrode 162 at positions near opposite ends of the lower electrode 162 in the direction of the length thereof. The MR elements 150 may each include, for example, a magnetization free layer 151, a nonmagnetic layer 152, a magnetization pinned layer 153, and an antiferromagnetic layer 154 that are staked in this order from the lower electrode 162 side. The magnetization free layer 151 may be electrically coupled to the lower electrode 162. The antiferromagnetic layer 154 includes an antiferromagnetic material. The antiferromagnetic layer 154 may be exchange-coupled to the magnetization pinned layer 153 to thereby pin the magnetization direction of the magnetization pinned layer 153. The upper electrodes 163 may be disposed on the MR elements 150. The upper electrodes 163 may each have a long slender shape, and may electrically couple the respective antiferromagnetic layers 154 of two adjacent MR elements 150 that are disposed on two lower electrodes 162 adjacent to each other in the direction of the lengths of the lower electrodes 162. With such a configuration, the magnetic detection device illustrated in FIG. 8 may include the two or more MR elements 150 coupled in series to each other by the two or more lower electrodes 162 and the two or more upper electrodes 163. It is to be noted that the magnetization free layer 151, the nonmagnetic layer 152, the magnetization pinned layer 153, and the antiferromagnetic layer 154 in the MR element 150 may be stacked in the reverse order to that illustrated in FIG. 8.

Next, operations of the drive unit 3 will be described with reference to FIGS. 1 to 5. To begin with, the optical image stabilization mechanism and the autofocus mechanism will be described briefly. The drive unit 3 may constitute a portion of each of the optical image stabilization mechanism and the autofocus mechanism. The drive unit 3, the optical image stabilization mechanism, and the autofocus mechanism may be controlled by a controller 4 (see FIG. 1) provided outside the imaging apparatus 100.

The optical image stabilization mechanism may be configured to detect a hand-induced apparatus shake using, for example, a gyro sensor outside the imaging apparatus 100. Upon detection of a hand-induced apparatus shake by the optical image stabilization mechanism, the controller 4 may control the drive unit 3 to change a relative position of the lens 5 with respect to the substrate 7 in accordance with the mode of the apparatus shake. This makes it possible to stabilize the absolute position of the lens 5 to thereby reduce an influence of the apparatus shake. It is to be noted that the relative position of the lens 5 with respect to the substrate 7 may change either in a direction parallel to the U-axis or in a direction parallel to the V-axis, depending on the mode of the apparatus shake.

The autofocus mechanism may be configured to detect an in-focus state of a subject using, for example, the image sensor 200 or an autofocus sensor. The controller 4 may cause the drive unit 3 to change the relative position of the lens 5 with respect to the substrate 7 along the Z-axis to bring the subject into focus. It is thereby possible to achieve automatic focusing on the subject.

Next, a description will be given of an operation of the drive unit 3 related to the optical image stabilization mechanism. Upon passage of electric currents through the coils 41 and 42 by the controller 4, an interaction between the magnetic fields occurring from the magnets 31A and 32A and magnetic fields occurring from the coils 41 and 42 causes the first holding member 14 with the magnets 31A and 32A fixed thereto to move along the V-axis. As a result, the lens 5 also moves along the V-axis. Upon passage of electric currents through the coils 43 and 44 by the controller 4, an interaction between the magnetic fields occurring from the magnets 33A and 34A and magnetic fields occurring from the coils 43 and 44 causes the first holding member 14 with the magnets 33A and 34A fixed thereto to move along the U-axis. As a result, the lens 5 also moves along the U-axis. The controller 4 may detect the position of the lens 5 by measuring signals corresponding to the positions of the magnets 31A, 32A, 33A, and 34A generated by the magnetic sensors 30.

Next, an operation of the drive unit 3 related to the autofocus mechanism will be described. In a case of moving the relative position of the lens 5 with respect to the substrate 7 along the Z-axis, the controller 4 may pass an electric current through the coil 45 to cause the electric current to flow through the first conductor 45A in the +U direction and flow through the second conductor 45B in the −U direction. The controller 4 may further pass an electric current through the coil 46 to cause the electric current to flow through the first conductor 46A in the −U direction and flow through the second conductor 46B in the +U direction. These electric currents and the magnetic fields occurring from the magnets 31A, 31B, 32A, and 32B cause a Lorentz force in the +Z direction to be exerted on the first conductor 45A and the second conductor 45B of the coil 45 and on the first conductor 46A and the second conductor 46B of the coil 46. This causes the second holding member 15 with the coils 45 and 46 fixed thereto to move in the +Z direction. As a result, the lens 5 also moves in the +Z direction.

In a case of moving the relative position of the lens 5 with respect to the substrate 7 in the −Z direction, the controller 4 may pass electric currents through the coils 45 and 46 in directions opposite to those in the case of moving the relative position of the lens 5 with respect to the substrate 7 in the +Z direction.

[Workings and Effects of Imaging Apparatus 100]

Next, workings and effects of the position detection unit 1 and the imaging apparatus 100 including the same according to the present example embodiment will be described. The position detection unit 1 according to the present example embodiment may be used to detect the position of the lens 5. In the present example embodiment, in the case where the relative position of the lens 5 with respect to the substrate 7 changes, the relative position of the second holding member 15 with respect to the substrate 7 and the first holding member 14 also changes. As described above, the first holding member 14 may hold the first magnetic field generator 11, and the second holding member 15 may hold the second magnetic field generator 12. Accordingly, a change in the relative position of the lens 5 may cause a change in the relative position of the second magnetic field generator 12 with respect to the first magnetic field generator 11, as described above. In the present example embodiment, the relative position of the second magnetic field generator 12 with respect to the first magnetic field generator 11 may change along the direction of the optical axis of the lens 5, that is, along a direction parallel to the Z-axis.

Upon a change in the relative position of the second magnetic field generator 12 with respect to the first magnetic field generator 11, a relative position of the second magnetic field generator 12 with respect to the substrate 7 changes, although a relative position of the first magnetic field generator 11 with respect to the substrate 7 does not change. Accordingly, upon a change in the relative position of the second magnetic field generator 12 with respect to the first magnetic field generator 11, an intensity of the second magnetic field MF2 at the detection position changes, although none of an intensity and the direction of the first magnetic field MF1 at the detection position and the direction of the second magnetic field MF2 at the detection position change. A change in the intensity of the second magnetic field MF2 at the detection position changes the direction and intensity of the composite magnetic field MF, i.e., the magnetic field of interest, and accordingly, changes a value of the detection signal to be generated by the magnetic sensor 20. The value of the detection signal to be generated by the magnetic sensor 20 changes in a manner dependent on the relative position of the second magnetic field generator 12 with respect to the first magnetic field generator 11. The controller 4 may be configured to measure the detection signal to thereby detect the relative position of the second magnetic field generator 12 with respect to the first magnetic field generator 11.

Reference is now made to FIG. 9 to describe the intensities and directions of the first magnetic field MF1, the second magnetic field MF2, and the composite magnetic field MF at the detection position. Hereinafter, the second magnetic field MF2 at the detection position is denoted as a magnetic field MF2a in a case where a distance between the detection position and the second magnetic field generator 12 is relatively large, and as a magnetic field MF2b in a case where the distance between the detection position and the second magnetic field generator 12 is relatively small. In FIG. 9, the direction of the magnetic field MF2a is represented by the direction of an arrow with a reference sign MF2a, and the intensity of the magnetic field MF2a is represented by the length of the arrow MF2a. Likewise, the direction of the magnetic field MF2b is represented by the direction of an arrow with a reference sign MF2b, and the intensity of the magnetic field MF2b is represented by the length of the arrow MF2b. As illustrated in FIG. 9, the intensity of the magnetic field MF2b is higher than the intensity of the magnetic field MF2a. The directions of the magnetic fields MF2a and MF2b are the same.

Note that FIG. 9 illustrates an example case where the relative angle θ illustrated in FIG. 6 is 135°. In this example, the direction of the magnetic field MF2a and the direction of the magnetic field MF2b both form an angle of 135° with respect to the direction of the first magnetic field MF1 at the detection position.

Further, a composite magnetic field of the first magnetic field MF1 and the magnetic field MF2a at the detection position is denoted by a reference sign MFa, and a composite magnetic field of the first magnetic field MF1 and the magnetic field MF2b at the detection position is denoted by a reference sign MFb. An angle that the direction of the composite magnetic field MFa forms with respect to the −Y direction serving as the reference direction is denoted by a reference sign θa. An angle that the direction of the composite magnetic field MFb forms with respect to the −Y direction serving as the reference direction is denoted by a reference sign θb. As illustrated in FIG. 9, the angle θb is greater than the angle θa (θb>θa). Thus, the angle that the direction of the composite magnetic field MF forms with respect to the reference direction (−Y direction) changes in a manner dependent on the intensity of the second magnetic field MF2. Further, the intensity of the second magnetic field MF2 changes in a manner dependent on the distance between the detection position and the second magnetic field generator 12. The angle that the direction of the composite magnetic field MF forms with respect to the reference direction (−Y direction) therefore changes in a manner dependent on the distance between the detection position and the second magnetic field generator 12.

In the present example embodiment, the magnetic sensor 20 may generate a detection signal corresponding to the angle that the direction of the composite magnetic field MF forms with respect to the reference direction, as the detection signal corresponding to the direction of the magnetic field of interest. The present example embodiment makes it possible to determine the distance between the detection position and the second magnetic field generator 12 from the detection signal, thereby making it possible to detect the relative position of the second magnetic field generator 12 with respect to the first magnetic field generator 11.

Further, in the present example embodiment, the relative angle θ illustrated in FIG. 6 may fall within a range greater than 90° and smaller than 180°. This allows an amount of change in the angle that the direction of the composite magnetic field MF forms with respect to the reference direction to be larger relative to an amount of change in the relative position of the second magnetic field generator 12 with respect to the first magnetic field generator 11, thereby making it possible to increase the sensitivity of position detection.

Further, in the present example embodiment, the shape of the magnets 31A and 34A and the shape of the magnet 13 may be different from each other. This makes it possible to configure the magnet 13 of the second magnetic field generator 12 into a shape suitable for the magnetic sensor 20 to detect the position of the magnet 13 along the Z-axis while configuring the magnets 31A and 34A of the first magnetic field generator 11 into a shape suitable as a drive source to move the lens 5 along the Z-axis. In addition, in the present example embodiment, the first magnetic material used as a constituent material of the magnets 31A and 34A of the first magnetic field generator 11 and the second magnetic material used as a constituent material of the magnet 13 of the second magnetic field generator 12 may be different from each other. It is thus possible to approximate a thermal demagnetization rate of the magnets 31A and 34A of the first magnetic field generator 11 and a thermal demagnetization rate of the magnet 13 of the second magnetic field generator 12 to each other even if the shape of the magnets 31A and 34A and the shape of the magnet 13 are different from each other. This helps to suppress variations in the relative position of the second magnetic field generator 12 with respect to the first magnetic field generator 11 and the magnetic sensor 20 in the imaging apparatus 100 even in a case where a change in temperature occurs in an environment in which the position detection unit 1 is installed. In other words, a change in the ambient temperature less affects the accuracy of position detection for the lens 5 by the magnetic sensor 20, and it is thus possible to reduce temperature dependence of the accuracy of position detection for the lens 5 by the magnetic sensor 20. As a result, the imaging apparatus 100 according to the present example embodiment makes it possible to change the position of the lens 5 more accurately and to thereby acquire an image of better quality.

Further, in the present example embodiment, the second temperature coefficient of residual magnetic flux density that the magnet 13 has may be smaller in absolute value than the first temperature coefficient of residual magnetic flux density that the magnets 31A and 34A have. This makes it possible to further suppress a reduction in accuracy of position detection for the lens 5 by the magnetic sensor 20 associated with a change in the ambient temperature.

Figure 10A:
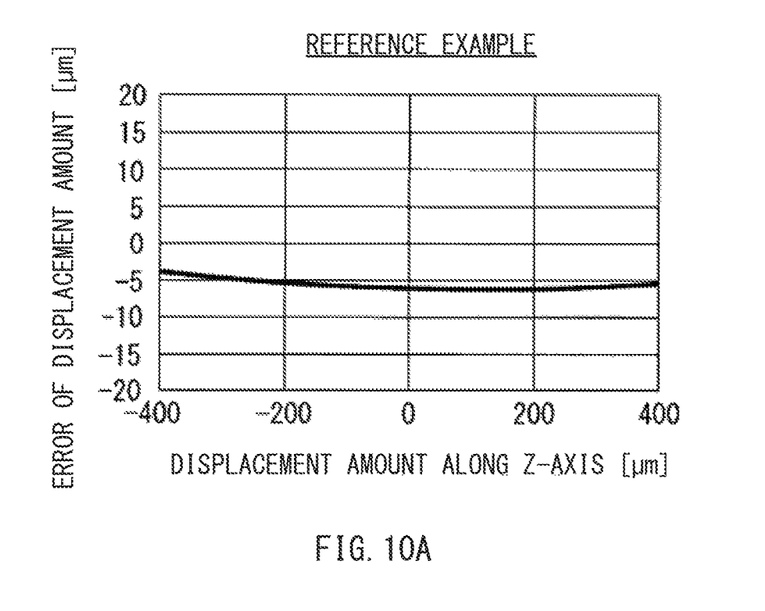
FIG. 10A is a characteristic chart illustrating a detection error of a position detection unit according to a reference example.

FIG. 10A illustrates a temperature characteristic of a position detection unit according to a reference example. In FIG. 10A, the horizontal axis represents an actual displacement amount [μm] of the lens 5 along the Z-axis, and the vertical axis represents a largest error [μm] of a measured value with the position detection unit with respect to the actual displacement amount of the lens 5 along the Z-axis in a case where the ambient temperature varied in a range from 25° C. to 65° C. Regarding the displacement amount [μm] on the horizontal axis, a displacement in the +Z direction is represented by a positive value and a displacement in the −Z direction is represented by a negative value with respect to a reference position set at 0. In this reference example, NdFeB of grade N48SH was used as a constituent material of the magnets 31A and 34A, and NdFeB of grade N48H was used as a constituent material of the magnet 13. Further, in the reference example, the magnets 31A and 34A each had a rectangular parallelepiped shape with dimensions of 7 mm in length×1 mm in width×0.5 mm in thickness, and the magnet 13 had a rectangular parallelepiped shape with dimensions of 1 mm in length×0.8 mm in width×0.5 mm in thickness. As a result, the magnets 31A and 34A each had a thermal demagnetization rate of −3.5%, whereas the magnet 13 had a thermal demagnetization rate of −4.51%. As illustrated in FIG. 10A, it is seen that with the position detection unit according to the reference example, a largest error occurring upon displacement of the lens 5 in a range from −400 μm to +400 μm along the Z-axis was 6 μm.

Figure 10B:
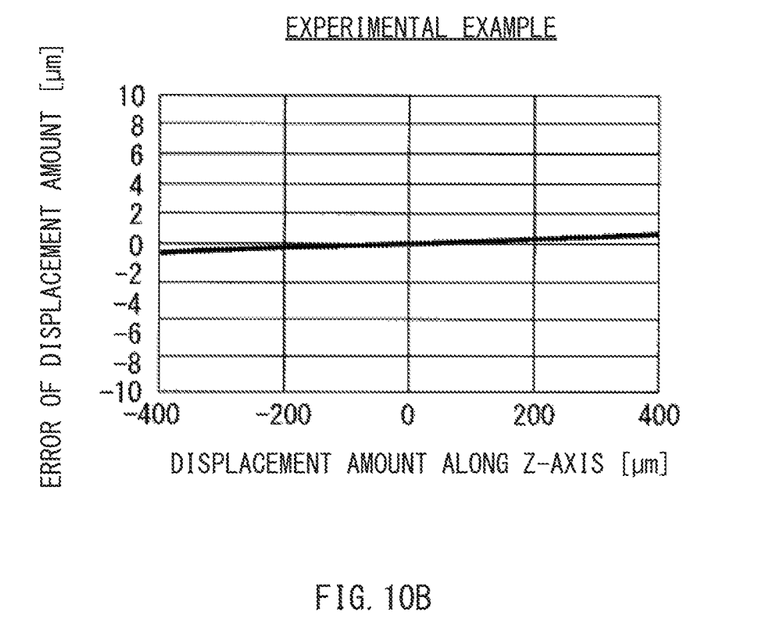
FIG. 10B is a characteristic chart illustrating a detection error of a position detection unit according to an experimental example.

FIG. 10B illustrates a temperature characteristic of an experimental example of the position detection unit 1 of the present example embodiment. In FIG. 10B, the horizontal axis represents an actual displacement amount [μm] of the lens 5 along the Z-axis, and the vertical axis represents a largest error [μm] of a measured value with the position detection unit with respect to the actual displacement amount of the lens 5 along the Z-axis in the case where the ambient temperature varied in the range from 25° C. to 65° C. Regarding the displacement amount [μm] on the horizontal axis, similarly to FIG. 10A, a displacement in the +Z direction is represented by a positive value and a displacement in the −Z direction is represented by a negative value with respect to the reference position set at 0. In this experimental example, NdFeB of grade N48SH was used as a constituent material of the magnets 31A and 34A, and SmCo was used as a constituent material of the magnet 13. Further, in this experimental example, the magnets 31A and 34A each had a rectangular parallelepiped shape with dimensions of 7 mm in length×1 mm in width×0.5 mm in thickness, and the magnet 13 had a rectangular parallelepiped shape with dimensions of 1 mm in length×0.8 mm in width×0.5 mm in thickness. As a result, the magnets 31A and 34A each had a thermal demagnetization rate of −3.5%, and the magnet 13 also had a thermal demagnetization rate of −3.5%. As illustrated in FIG. 10B, it is seen that with this experimental example, a largest error occurring upon displacement of the lens 5 in the range from −400 μm to +400 μm along the Z-axis was as small as 0.6 μm.

[2. Modification Example]

The technology has been described above with reference to the example embodiment. However, the technology is not limited thereto, and may be modified in a variety of ways. For example, the foregoing example embodiment has been described with reference to a case where four magnetic detection devices are used to form a full-bridge circuit in the magnetic sensor. However, in some embodiments of the technology, for example, two magnetic detection devices may be used to form a half-bridge circuit. Further, the magnetoresistive effect elements may be identical with each other or different from each other in shape and/or dimensions. The dimensions of components and the layouts of the components are merely illustrative, and are not limited thereto.

The position detection unit of an embodiment of the technology is not limited to a unit configured to detect the position of a lens but may be a unit configured to detect the position of any object other than a lens in a space.

In the foregoing example embodiment, the first magnet may generate the first magnetic field to be used as a drive source to drive the lens and the second holding member holding the lens. However, embodiments of the technology are not limited thereto. In some embodiments, the first magnet may be used, for example, as a bias magnet to apply a bias to a magnetoresistive effect element of a magnetic sensor.

In the position detection unit 1 of the foregoing example embodiment, mutually different materials may be selected as the first magnetic material to be included in the first magnet and the second magnetic material to be included in the second magnet, and mutually different shapes may be employed for the first magnet and the second magnet to thereby make the respective thermal demagnetization rates of the first magnet and the second magnet closer to each other. However, embodiments of the technology are not limited thereto. For example, the first magnet and the second magnet may include the same magnetic material (the first magnetic material) and have their respective permeance coefficients (a first permeance coefficient and a second permeance coefficient, respectively) substantially equal to each other. In such a case, for example, the shapes of the first magnet and the second magnet may be identical or similar to each other. With such a configuration, it is also possible to make the respective thermal demagnetization rates of the first magnet and the second magnet closer to each other. As a result, the respective temperature characteristics of the first magnet and the second magnet are approximated to each other, which makes it possible to reduce error of position detection accuracy.

The technology encompasses any possible combination of some or all of the various embodiments and the modifications described herein and incorporated herein.

It is possible to achieve at least the following configurations from the foregoing embodiments and modification examples of the technology.

(1)

A position detection unit including:
a magnetic sensor;
a first magnetic field generator that includes a first magnet and generates a first magnetic field, the first magnet including a first magnetic material and having a first shape; and
a second magnetic field generator that includes a second magnet, generates a second magnetic field, and is movable along a first direction with respect to the first magnetic field generator and the magnetic sensor, the second magnet including a second magnetic material and having a second shape,
the magnetic sensor being configured to generate a detection signal that corresponds to a direction of a magnetic field of interest, and configured to detect a positional change of the second magnetic field generator, the magnetic field of interest being a composite of the first magnetic field along a first plane and the second magnetic field along the first plane.

(2)

The position detection unit according to (1), in which the first magnet has a first temperature coefficient of residual magnetic flux density, and the second magnet has a second temperature coefficient of residual magnetic flux density, the second temperature coefficient of residual magnetic flux density being smaller in absolute value than the first temperature coefficient of residual magnetic flux density.

(3)

The position detection unit according to (1) or (2), in which
the first magnetic material includes NdFeB, and
the second magnetic material includes SmCo.

(4)

The position detection unit according to any one of (1) to (3), in which the first plane is perpendicular to the first direction.

(5)

The position detection unit according to any one of (1) to (4), further including:
- a first holding member holding the first magnetic field generator; and
- a second holding member holding the second magnetic field generator and movable along the first direction with respect to the first holding member.

(6)

The position detection unit according to (5), in which the second holding member is configured to hold a lens having an optical axis along the first direction.

(7)

A position detection unit including:
- a magnetic sensor;
- a first magnetic field generator that includes a first magnet and generates a first magnetic field, the first magnet including a first magnetic material and having a first permeance coefficient; and
- a second magnetic field generator that includes a second magnet, generates a second magnetic field, and is movable along a first direction with respect to the first magnetic field generator and the magnetic sensor, the second magnet including the first magnetic material and having a second permeance coefficient equal to the first permeance coefficient,
- the magnetic sensor being configured to generate a detection signal that corresponds to a direction of a magnetic field of interest, and configured to detect a positional change of the second magnetic field generator, the magnetic field of interest being a composite of the first magnetic field in a predetermined plane and the second magnetic field in the predetermined plane.

(8)

A lens module including:
- a magnetic sensor;
- a first magnetic field generator that includes a first magnet and generates a first magnetic field, the first magnet including a first magnetic material and having a first shape;
- a second magnetic field generator that includes a second magnet, generates a second magnetic field, and is movable along a first direction with respect to the first magnetic field generator and the magnetic sensor, the second magnet including a second magnetic material and having a second shape; and
- a lens movable along the first direction in conjunction with the second magnetic field generator with respect to the first magnetic field generator and the magnetic sensor,
- the magnetic sensor being configured to generate a detection signal that corresponds to a direction of a magnetic field of interest, and configured to detect a positional change of the second magnetic field generator, the magnetic field of interest being a composite of the first magnetic field along a first plane and the second magnetic field along the first plane.

(9)

The lens module according to (8), further including
- a first holding member holding the first magnetic field generator; and
- a second holding member holding the second magnetic field generator and the lens, and movable along the first direction with respect to the first holding member.

(10)

A lens module including:
- a magnetic sensor;
- a first magnetic field generator that includes a first magnet and generates a first magnetic field, the first magnet including a first magnetic material and having a first permeance coefficient;
- a second magnetic field generator that includes a second magnet, generates a second magnetic field, and is movable along a first direction with respect to the first magnetic field generator and the magnetic sensor, the second magnet including the first magnetic material and having a second permeance coefficient equal to the first permeance coefficient; and
- a lens movable along the first direction in conjunction with the second magnetic field generator with respect to the first magnetic field generator and the magnetic sensor,
- the magnetic sensor being configured to generate a detection signal that corresponds to a direction of a magnetic field of interest, and configured to detect a positional change of the second magnetic field generator, the magnetic field of interest being a composite of the first magnetic field in a predetermined plane and the second magnetic field in the predetermined plane.

(11)

An imaging apparatus including
an imaging element, and
a lens module,
the lens module including:
- a magnetic sensor;
- a first magnetic field generator that includes a first magnet and generates a first magnetic field, the first magnet including a first magnetic material and having a first shape;
- a second magnetic field generator that includes a second magnet, generates a second magnetic field, and is movable along a first direction with respect to the first magnetic field generator and the magnetic sensor, the second magnet including a second magnetic material and having a second shape; and
- a lens movable along the first direction in conjunction with the second magnetic field generator with respect to the first magnetic field generator and the magnetic sensor,
- the magnetic sensor being configured to generate a detection signal that corresponds to a direction of a magnetic field of interest, and configured to detect a positional change of the second magnetic field generator, the magnetic field of interest being a composite of the first magnetic field along a first plane and the second magnetic field along the first plane.

(12)

An imaging apparatus including
an imaging element, and
a lens module,
the lens module including:
- a magnetic sensor;
- a first magnetic field generator that includes a first magnet and generates a first magnetic field, the first magnet including a first magnetic material and having a first permeance coefficient;
- a second magnetic field generator that includes a second magnet, generates a second magnetic field, and is movable along a first direction with respect to the first magnetic field generator and the magnetic sensor, the second magnet including the first magnetic material and having a second permeance coefficient equal to the first permeance coefficient; and a lens movable along the first direction in conjunction with the second magnetic field generator with respect to the first magnetic field generator and the magnetic sensor, the magnetic sensor being configured to generate a detection signal that corresponds to a direction of a magnetic field of interest, and configured to detect a positional change of the second magnetic field generator, the magnetic field of interest being a composite of the first magnetic field in a predetermined plane and the second magnetic field in the predetermined plane.

The position detection unit, the lens module, and the imaging apparatus_according to at least one embodiment of the technology achieve high detection accuracy.

Although the technology has been described hereinabove in terms of the example embodiment and modification examples, it is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A position detection unit comprising:
  a magnetic sensor;
  a first magnetic field generator that includes a first magnet and generates a first magnetic field, the first magnet including a first magnetic material and having a first shape; and
  a second magnetic field generator that includes a second magnet, generates a second magnetic field, and is movable along a first direction with respect to the first magnetic field generator and the magnetic sensor, the second magnet including a second magnetic material and having a second shape,
  wherein the magnetic sensor is configured to generate a detection signal that corresponds to a direction of a magnetic field of interest, and configured to detect a positional change of the second magnetic field generator, the magnetic field of interest being a composite of the first magnetic field along a first plane and the second magnetic field along the first plane, and
  wherein the first magnet has a first temperature coefficient of residual magnetic flux density, and the second magnet has a second temperature coefficient of residual magnetic flux density, the second temperature coefficient of residual magnetic flux density being smaller in absolute value than the first temperature coefficient of residual magnetic flux density.

2. The position detection unit according to claim 1, wherein
  the first magnetic material includes NdFeB, and
  the second magnetic material includes SmCo.

3. The position detection unit according to claim 1, wherein the first plane is perpendicular to the first direction.

4. The position detection unit according to claim 1, further comprising:
  a first holding member holding the first magnetic field generator; and
  a second holding member holding the second magnetic field generator and movable along the first direction with respect to the first holding member.

5. The position detection unit according to claim 4, wherein the second holding member is configured to hold a lens having an optical axis along the first direction.

6. A position detection unit comprising:
  a magnetic sensor;
  a first magnetic field generator that includes a first magnet and generates a first magnetic field, the first magnet including a first magnetic material and having a first permeance coefficient; and
  a second magnetic field generator that includes a second magnet, generates a second magnetic field, and is movable along a first direction with respect to the first magnetic field generator and the magnetic sensor, the second magnet including the first magnetic material and having a second permeance coefficient equal to the first permeance coefficient,
  wherein the magnetic sensor is configured to generate a detection signal that corresponds to a direction of a magnetic field of interest, and configured to detect a positional change of the second magnetic field generator, the magnetic field of interest being a composite of the first magnetic field in a predetermined plane and the second magnetic field in the predetermined plane, and
  wherein the first magnet has a first temperature coefficient of residual magnetic flux density, and the second magnet has a second temperature coefficient of residual magnetic flux density, the second temperature coefficient of residual magnetic flux density being smaller in absolute value than the first temperature coefficient of residual magnetic flux density.

* * * * *